(12) United States Patent
Timiskov et al.

(10) Patent No.: US 10,075,549 B2
(45) Date of Patent: Sep. 11, 2018

(54) OPTIMIZER MODULE IN HIGH LOAD CLIENT/SERVER SYSTEMS

(71) Applicant: Quest Software Inc., Aliso Viejo, CA (US)

(72) Inventors: Anton Timiskov, St. Petersburg (RU); Grigory Vasiliev, St. Petersburg (RU)

(73) Assignee: Quest Software Inc., Aliso Viejo, CA (US)

( * ) Notice: Subject to any disclaimer, the term of this patent is extended or adjusted under 35 U.S.C. 154(b) by 177 days.

(21) Appl. No.: 15/005,846

(22) Filed: Jan. 25, 2016

(65) Prior Publication Data
US 2017/0214759 A1    Jul. 27, 2017

(51) Int. Cl.
G06F 15/16 (2006.01)
H04L 29/08 (2006.01)
H04L 29/06 (2006.01)

(52) U.S. Cl.
CPC .............. *H04L 67/28* (2013.01); *H04L 67/02* (2013.01); *H04L 67/10* (2013.01); *H04L 67/42* (2013.01)

(58) Field of Classification Search
CPC .......... H04L 67/10; H04L 67/42; H04L 67/02
See application file for complete search history.

(56) References Cited

U.S. PATENT DOCUMENTS

| | | | | |
|---|---|---|---|---|
| 6,658,463 B1* | 12/2003 | Dillon | ............... | H04L 29/12132 709/203 |
| 9,626,120 B1* | 4/2017 | Jia | .......................... | G06F 3/0631 |
| 2004/0194087 A1* | 9/2004 | Brock | ..................... | G06F 9/505 718/100 |
| 2011/0225367 A1* | 9/2011 | Rajvanshy | .......... | G06F 12/0866 711/118 |
| 2014/0101235 A1* | 4/2014 | Smedberg | ........... | G06F 17/2235 709/203 |
| 2015/0016261 A1* | 1/2015 | Backholm | ............... | H04L 47/32 370/235 |
| 2016/0077901 A1* | 3/2016 | Roth | ................... | G06F 9/45529 719/328 |

* cited by examiner

*Primary Examiner* — Padma Mundur
(74) *Attorney, Agent, or Firm* — Kirton McConkie; Brian Tucker (57) ABSTRACT

An optimizer module can function as a proxy between clients and a server that provides access to a service via a REST API. As a proxy, the optimizer module can receive requests from the clients and can combine the requests into a single bulk request that is then submitted to the server. By combining multiple independent requests into a single bulk request, the optimizer module can reduce the total number of concurrent requests and thereby increase the total number of clients that can concurrently submit requests. In some cases, the optimizer module may be configured to apply optimizing rules when generating a bulk request.

15 Claims, 10 Drawing Sheets

OPTIMIZER MODULE IN HIGH LOAD CLIENT/SERVER SYSTEMS

CROSS-REFERENCE TO RELATED APPLICATIONS

N/A

BACKGROUND

The present invention is generally directed to servers. In particular, the present invention is directed to increasing the performance of an HTTP server that is accessible via a REST API. HTTP servers may implement a REST API to allow clients to access a number of different services, such as, for example, a database or cloud services. One problem that exists with HTTP servers is that their performance can deteriorate if too many requests are concurrently submitted. For each request that an HTTP server receives, it requires a certain amount of overhead in resource usage (e.g., network, CPU, memory, disk, etc.). With an increased number of requests, the amount of resources available to service the request is reduced. As a result, the HTTP server may respond with failures or hang for long periods of time.

BRIEF SUMMARY

The present invention extends to methods, systems, and computer program products which implement an optimizer module in high load client/server systems. The optimizer module can function as a proxy between HTTP clients and an HTTP server that provides access to a service, such as a database or a cloud service, via a REST API. As a proxy, the optimizer module can receive requests from the HTTP clients and can combine the requests into a single bulk request that is then submitted to the HTTP server. In some cases, in addition to combining multiple independent requests into a bulk request, the optimizer module may also optimize the parameters or ordering of the individual operations within the bulk request.

By combining multiple independent requests into a single bulk request, the optimizer module can take advantage of the performance enhancements that bulk requests provide including the reduction of overhead that is associated with the submission of each request (e.g., the creation and closing of many server connections). Additionally, by combing independent requests into a bulk request, the total number of requests that the server receives is reduced thereby increasing the total number of clients that may concurrently submit requests. In some embodiments, the optimizer module may also be configured to split an oversized request from an HTTP client into multiple requests if doing so would improve the performance of the request or otherwise prevent a failure.

In one embodiment, the present invention is implemented as a method, performed by an optimizer module that functions as a proxy between a server that provides access to a resource and a number of clients, for optimizing the performance of the server. The optimizer module receives requests for accessing the resource from a number of clients. The optimizer module then buffers the received requests during a buffering interval. The optimizer module also creates a number of bulk requests by combining multiple buffered requests into each bulk request. After the buffering interval, the optimizer module sends the bulk requests to the server. In response and for each bulk request, the optimizer module receives a bulk response that includes multiple responses corresponding to the multiple requests. The optimizer then parses each bulk response to extract the multiple responses. Finally, the optimizer module sends each of the responses to the corresponding client.

In another embodiment, the present invention is implemented as a system for enabling more clients to concurrently submit HTTP requests to a server. The system includes the server that is configured to provide an API through which HTTP requests may be submitted for accessing a resource. The system also includes and an optimizer module that is configured to function as a proxy between the server and clients, the optimizer module being configured to: receive and buffer the clients' HTTP requests during a buffering interval; generate bulk requests by combining multiple buffered HTTP requests into each bulk request; and submit the bulk requests to the server such that the server receives and processes the bulk requests rather than the individual HTTP requests sent by the clients.

In another embodiment, the present invention is implemented as computer storage media storing computer executable instructions which when executed by one or more processors implements a method for increasing the performance of a server that provides access to a database via a REST API. The method includes: creating, by an optimizer module that functions as a proxy for the server, a buffer for buffering requests for accessing the database; receiving, by the optimizer module and during a buffering interval, a number of requests; storing the received requests in the buffer; and after the buffering interval, sending a number of bulk requests to the server, each bulk request including multiple requests that were stored in the buffer during the buffering interval.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
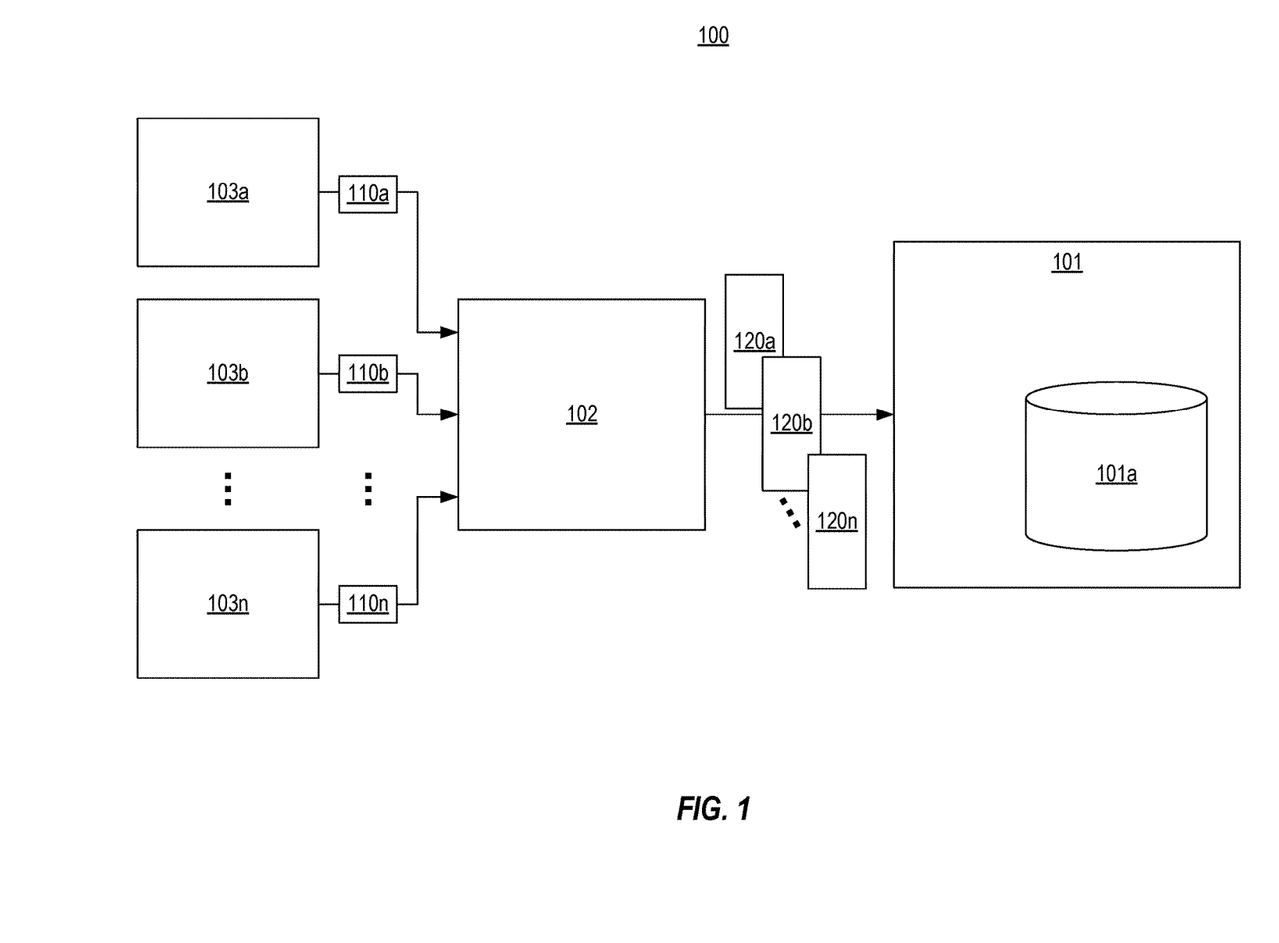
FIG. 1 illustrates an example computing environment in which the present invention can be implemented.

FIG. 1 illustrates an example computing environment 100 in which the present invention can be implemented. Computing environment 100 includes a server 101 that hosts or otherwise provides access to a database 101a and a number of client devices 103a-103n. Server 101 provides a REST API by which clients 103a-103n can submit requests 110a-110n for accessing database 101a. Clients 103a-103n can represent any type of device or process that is capable of submitting an HTTP request to server 101. For example, clients 103a-103n can include browsers, data processing agents, mobile devices, etc.

In accordance with embodiments of the present invention, computing environment 100 also includes an optimizer module 102 that functions as a proxy between server 101 and clients 103a-103n. Optimizer module 102 may be executed on the same computing device as server 101 or may be executed on a separate computing device.

As an overview, optimizer module 102 is configured to receive a number of requests 110a-110n and combine them into a reduced number of bulk requests 120a-120n which can then be submitted to server 101. For purposes of this specification, a bulk request should be construed as a request that includes more than one operation (e.g., more than one database query). Also, the requests that are received by optimizer module 102 may also be bulk requests. Accordingly, optimizer module 102 is configured to create bulk requests from a number of independent HTTP requests even if one or more of the independent HTTP requests are bulk requests. In short, optimizer module 102 creates a bulk request that includes operations from multiple different HTTP requests.

It is noted that FIG. 1 depicts an example where server 101 provides access to a database 101a. However, the present invention can be implemented in a computing environment where server 101 provides access to other types of services, such as cloud services, via a REST API. Therefore, although this specification will describe the invention with primary reference to embodiments that involve accessing a database, the present invention should be construed as extending to embodiments where server 101 provides access to any type of service via a REST API (i.e., via appropriately configured HTTP requests).

Figure 2:
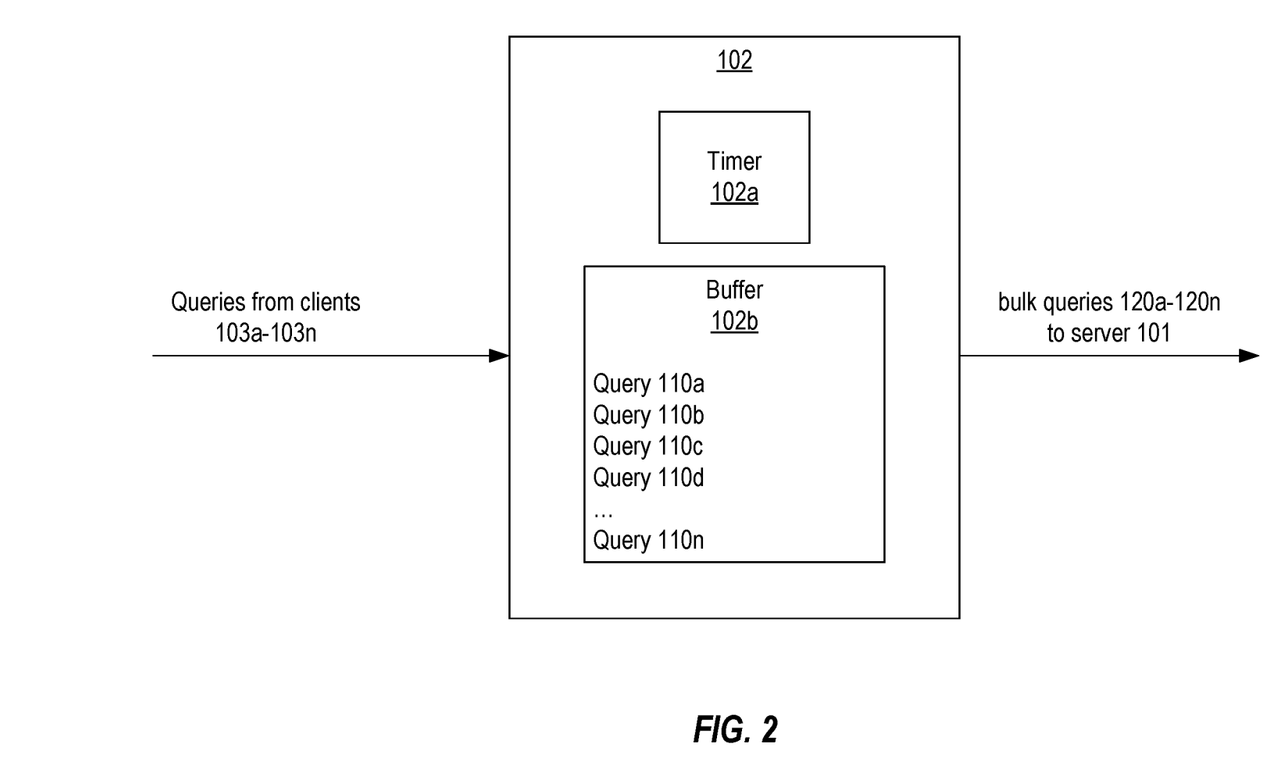
FIG. 2 illustrates how an optimizer module can act as a proxy for a server to allow the optimizer module to generate bulk requests from a number of individual requests sent by clients.

FIG. 2 provides a more detailed illustration of how optimizer module 102 functions. As shown, optimizer module 102 includes a timer 102a and a buffer 102b. Buffer 102b is used to temporarily store requests as they are received from clients 103a-103n. Timer 102a is used to define an interval for creating bulk requests from the requests that are buffered in buffer 102b. By way of example only, timer 102a may be set to 100 milliseconds so that requests received during a 100 millisecond interval are buffered and then combined into bulk requests after the 100 millisecond interval. In other words, at periodic intervals, optimizer module 102 can be configured to extract operations from multiple different requests stored in buffer 102b and combine these operations into a single bulk request.

In an example implementation, thousands of requests may be received by optimizer module 102 within a 100 millisecond interval. The operations of these thousands of requests could then be combined together into tens or hundreds of bulk requests which would then be submitted to server 101. In this way, the number of requests is greatly reduced thereby eliminating the likelihood that server 101's resources will be consumed by too many concurrent requests.

Because optimizer module 102 functions as a proxy, this conversion of multiple requests into a bulk request can be performed in a manner that is transparent to the server and the clients. In other words, from server 101's perspective, it will appear as if a single client has submitted a bulk request. Therefore, the present invention can be implemented with minimal, if any, modification to server 101 or clients 103a-103n.

The creation of a bulk request from multiple separate requests can be performed in a number of different manners. For example, in a most basic embodiment, optimizer module 102 may be configured to merely group a number of consecutively buffered requests into a bulk request. However, in preferred embodiments, optimizer module 102 may employ a server specification or monitored performance parameters of server 101 to determine an optimal way to combine requests into bulk requests. These optimizations may include: creating a bulk request with an optimal size, ordering elements of individual operations included in the bulk request in an optimal manner, ordering the individual requests in an optimal manner, optimizing the number of bulk requests submitted in parallel, specifying an optimal compression ratio, etc.

As indicated, the type of optimizations that are performed may be determined manually by consulting a server specification for the specific server. Alternatively, optimizer module 102 may be configured to monitor the performance of server 101 over time to identify which characteristics of bulk requests result in better server performance. For example, the optimizer module 102 may monitor the response time of server 101 to determine which optimizations result in a lower response time and then employ such optimizations on future bulk requests.

Figure 3A:
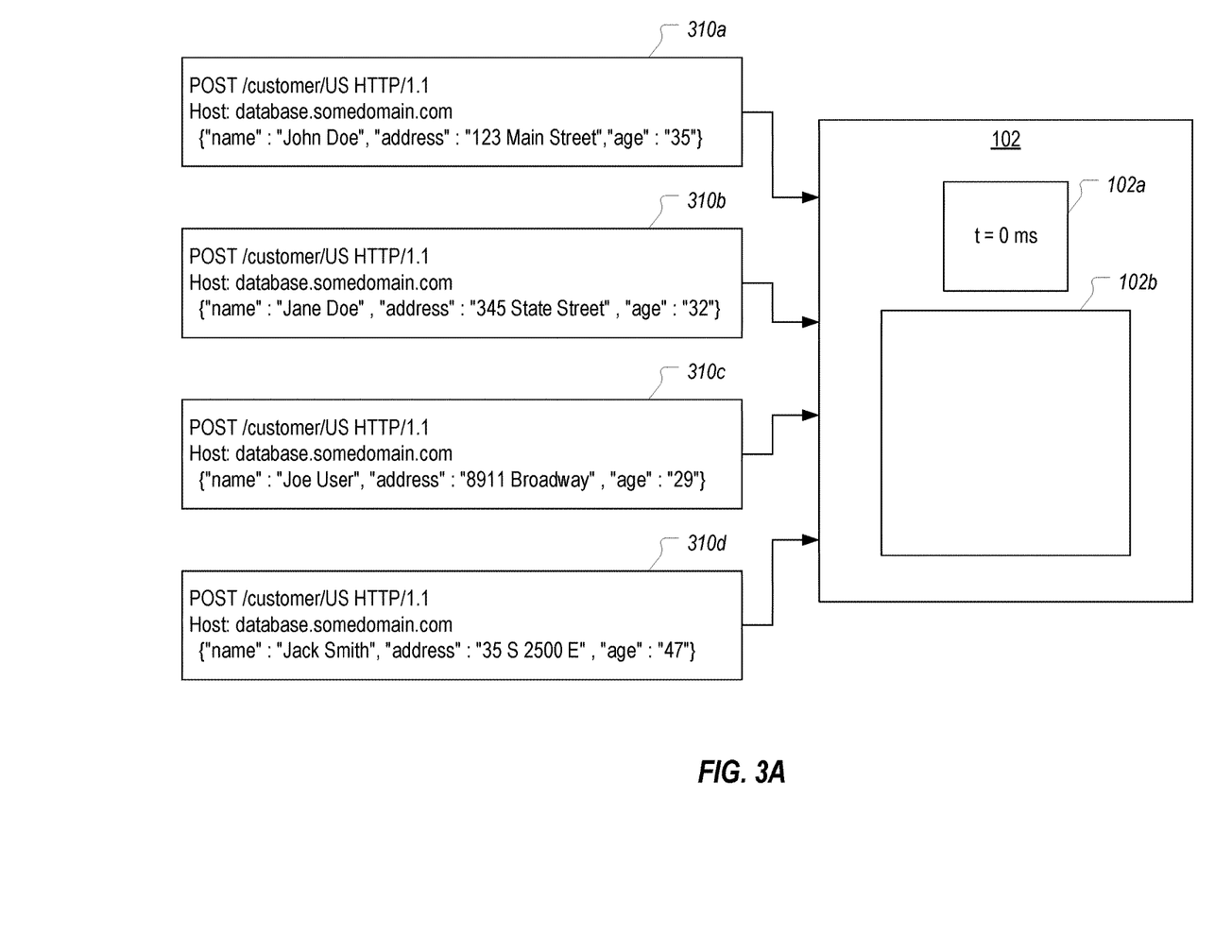
FIGS. 3A-3C provide an example of how the optimizer module can create a bulk request.
Figure 3B:
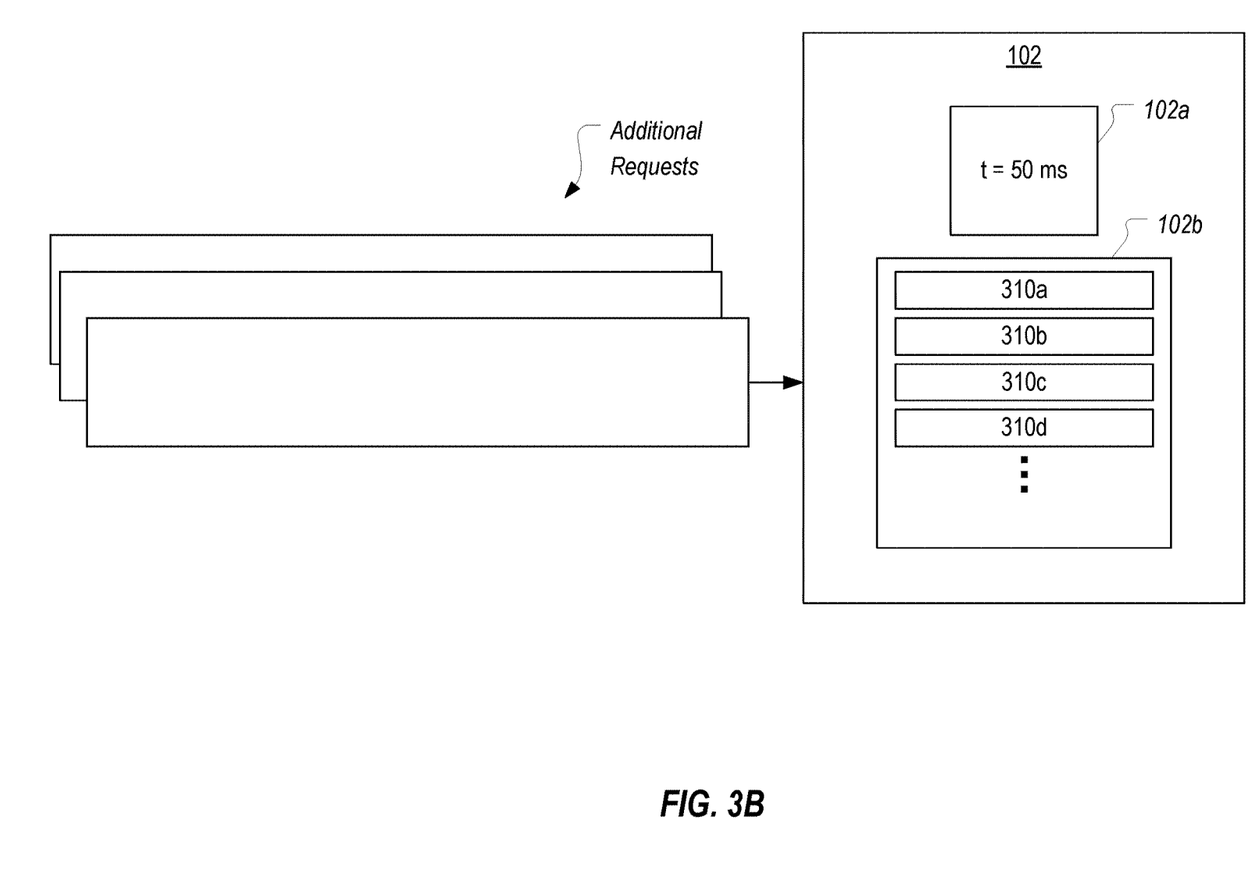
Figure 3C:
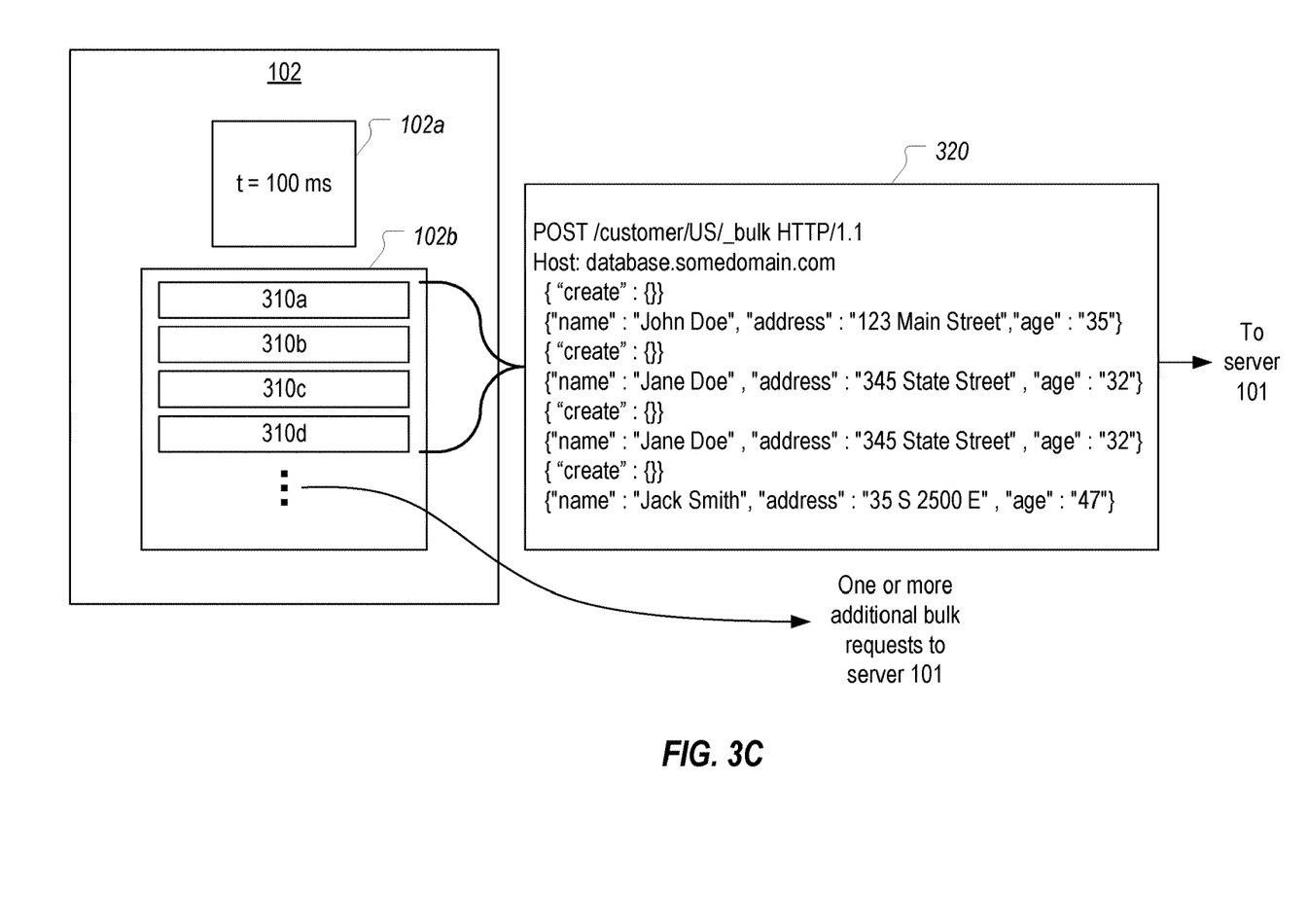

FIGS. 3A-3C provide a specific example of how optimizer module 102 can create a bulk request from a number of individual requests in an embodiment where server 101 provides access to an Elasticsearch database. In other words, the requests in this example are configured in accordance with the Elasticsearch API. In this example, it will be assumed that the Elasticsearch database includes a customer index that stores the name, address, and age of customers. For ease of illustration, the requests in this example are simplified to remove many of the HTTP headers that would appear in an actual request.

Also, for ease of illustration, it will be assumed that optimizer module 102 has no requests buffered at the commencement of the example process (i.e., at time t=0 ms) and that optimizer module 102 is configured to buffer requests over an interval of 100 ms (i.e., until time t=100 ms) prior to generating and sending bulk requests. Accordingly, FIG. 3A illustrates that optimizer module 102 receives four HTTP requests 310a-310d at time t=0 ms. It will be assumed that each of these requests 310a-310d is received from a different client (e.g., clients 103a-103d).

In accordance with the Elasticsearch API, each of requests 310a-310d defines an index operation for adding a customer document to the customer database. In particular, the /customer/US portion of the requests identifies the customer index (which is assumed to have already been created) and a type of US for the documents. Each of requests 310a-310d also specifies a host of database.somedomain.com which is assumed to be resolved to the IP address and port number on which optimizer module 102 is listening. Each of requests 310a-310d further specifies a JSON document defining the name, address, and age of the particular customer to be added to the customer index.

When requests 310a-310d are received by optimizer module 102, they are buffered in buffer 102b until the buffering interval has lapsed. For example, FIG. 3B, which represents an example state of optimizer module 102 at time t=50 ms, illustrates that requests 310a-310d (and possibly many others as indicated by the ellipsis) have been stored in buffer 102b. FIG. 3B also indicates that additional requests are being received and will be buffered because the buffering interval has not yet lapsed.

Then, once the 100 ms buffering interval has lapsed, optimizer module 102 can generate and send one or more bulk requests that each include contents (or operations) of multiple buffered requests. For example, FIG. 3C illustrates that optimizer module 102 has created a bulk request 320 that includes the index operations from each of requests 310a-310d. Accordingly, server 101 will receive bulk request 320 rather than requests 310a-310d.

As mentioned above, optimizer module 102 can be configured to create bulk requests in a manner that is most optimal for server 101. Accordingly, even though FIG. 3C depicts that bulk request 320 is created by combining four consecutively buffered requests, this may not be the case in many instances. For example, optimizer module 102 may select requests from buffer 102b that when combined will likely be executed most optimally. Optimizer module 102 may also order particular requests within a bulk request if such an ordering will likely result in better processing. Optimizer module 102 may also rearrange the parameters of a particular operation (e.g., the parameters of a create operation) if doing so would likely increase the efficiency of the operation. In short, the type of optimizations that optimizer module 102 may make would be specific to the configuration/performance of the server and are too numerous to list in detail.

In any case, regardless of whether it performs any optimizations when creating a bulk request, optimizer module 102 can increase the total number of clients that may concurrently access server 101. For example, if optimizer module 102 were not employed and the maximum number of concurrent requests that server 101 could handle were 200, a maximum of 200 clients would be able to concurrently submit requests to server 101. In many applications, this is a significant performance limitation. In contrast, when optimizer module 102 is employed, the maximum number of clients that can concurrently submit requests increases substantially since the clients' requests will be combined into a reduced number of bulk requests. For example, if optimizer module 102 were configured to combine 10 requests into each bulk request, the total number of clients that could concurrently submit requests would theoretically be 2000 rather than 200.

In some embodiments, there may be a maximum size for a request. In such cases, optimizer module 102 could be configured to create bulk requests that are within the defined maximum size. This maximum size could therefore determine how many requests are combined into each bulk request. Also, as indicated above, there may be an optimal (non-maximum) size for a bulk request (which could be determined from the server specifications or from monitoring server performance). In such cases, optimizer module 102 may combine a number of requests to yield a bulk request of optimal size.

Because optimizer module 102 combines multiple independent requests into a single bulk request, it will be necessary to maintain a mapping between the operations in the bulk request and the multiple independent requests so that optimizer module 102 may return the results from server 101 to the appropriate client. In particular, for each bulk request that optimizer module 102 submits, server 101 will return a bulk response. Optimizer module 102 can be configured to parse the bulk response in order to create the appropriate responses to send back to the corresponding clients.

As is known, whenever optimizer module 102 receives a request from a client, it will do so via a socket. Optimizer module 102 will therefore need to provide the response to the request over this same socket. There are a number of different ways that optimizer module 102 could define mappings between a bulk request and the individual sockets used to receive the requests that were combined into the bulk request. The particular way in which these mappings are defined may vary based on the particular requirements of the REST API.

Figure 4A:
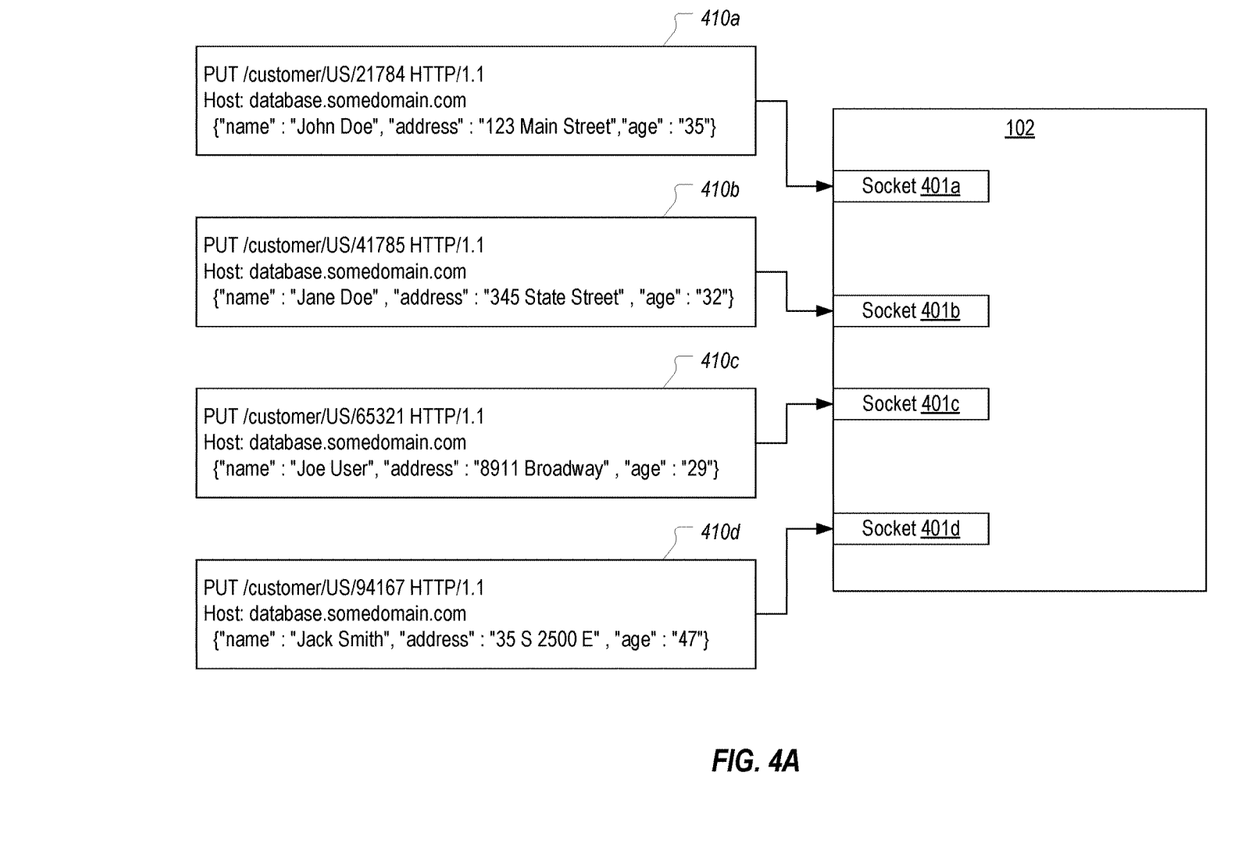
FIGS. 4A-4D provide another example of how the optimizer module can create a bulk request including how the optimizer module can define mappings to facilitate returning responses included in a bulk response to the appropriate clients.

FIGS. 4A-4D illustrate one possible way in which optimizer module 102 could define mappings for routing responses back to the clients. In this example, optimizer module 102 will employ a mapping between a socket identifier and an identifier of the document that is the subject of the request received over the socket. As shown in FIG. 4A, optimizer module 102 receives requests 410a-410d via sockets 401a-401d respectively. For simplicity, the buffering of these requests is not depicted although such buffering would be performed in the manner described.

Figure 4B:
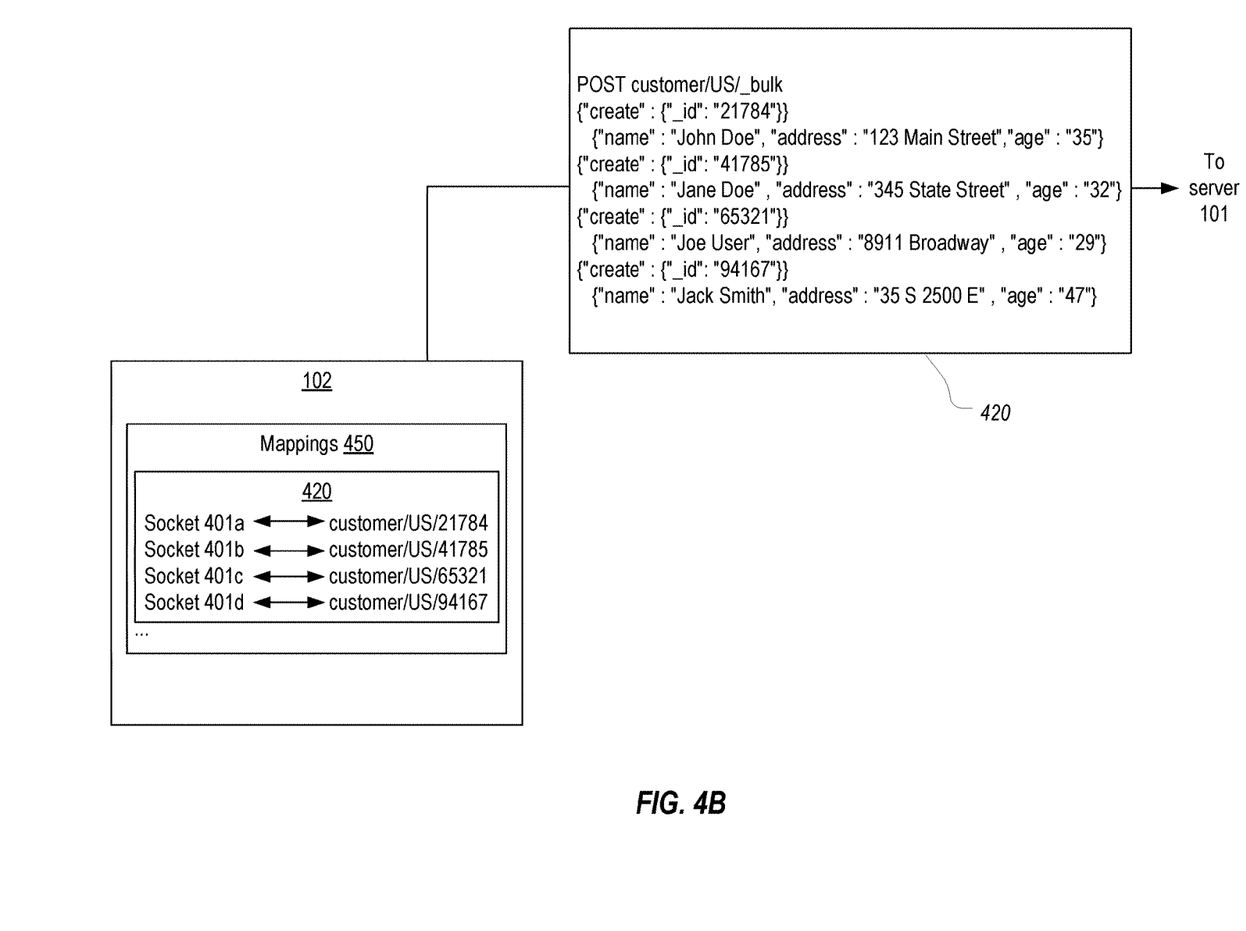

FIG. 4B illustrates how optimizer module 102 creates mappings 450 to allow results to be sent over the proper socket once they are received. In this example, an identifier of socket 401a is mapped to "customer/US/21784" which is the identifier used to uniquely identify the document included in request 410a. The "customer/US" portion is also included since identifiers in Elasticsearch are only unique within an index and type. Similar mappings are defined between identifiers of sockets 401b-401d and the unique identifiers of documents included in the requests received over these sockets. These mappings therefore define that any result pertaining to the particular identifier should be returned over the corresponding socket. In some embodiments, mappings may be grouped based on the bulk response to which they pertain. For example, FIG. 4B represents that an identifier of bulk request 420 is used to group the four mappings that pertain to the requests included in bulk request 420. FIG. 4B also illustrates that a bulk request 420 has been created that includes the operations of each of requests 410a-410d.

Figure 4C:
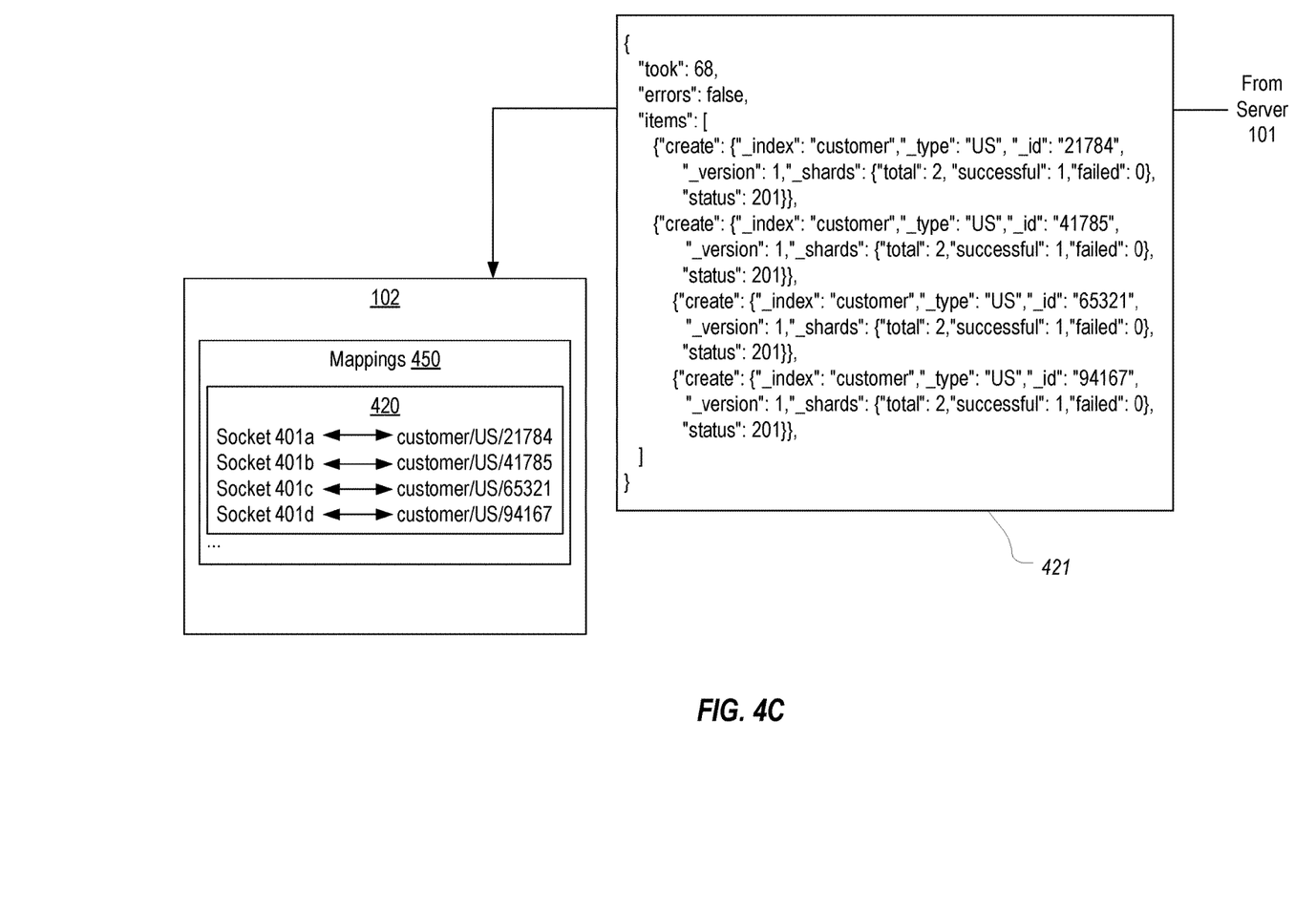

FIG. 4C illustrates an example bulk response 421 that server 101 could return to optimizer module 102 after processing bulk request 420. As shown, bulk response 421 includes a number of "items" where each item comprises a response to a request include in bulk request 420. Because bulk request 420 included four indexing (or "create") requests, bulk response 421 also includes four corresponding indexing (or "create") responses. In accordance with the Elasticsearch API, each indexing response identifies the index, type, and identifier for the document that was added to the database as well as other information.

When optimizer module 102 receives bulk response 421, it can parse the individual responses from the bulk response and then use mappings 450 to determine where to send each individual response. For example, the first response in bulk request 421 is:

{"create": {"_index": "customer","_type": "US", "_id": "21784", "_version": 1, "_shards": {"total": 2, "successful": 1,"failed": 0}, "status": 201}}

Optimizer module 102 could identify that this first response pertains to a document of type "US" in the customer index that has an identifier of 21784. Optimizer module 102 could employ this information to search mappings 450 to identify that the first result should be sent over socket 401a. This process could be performed on the remaining three results to determine that they should be sent over sockets 401*b*-401*d* respectively. As indicated above, by grouping mappings based on the corresponding bulk request, the searching of mappings 450 can be expedited.

Figure 4D:
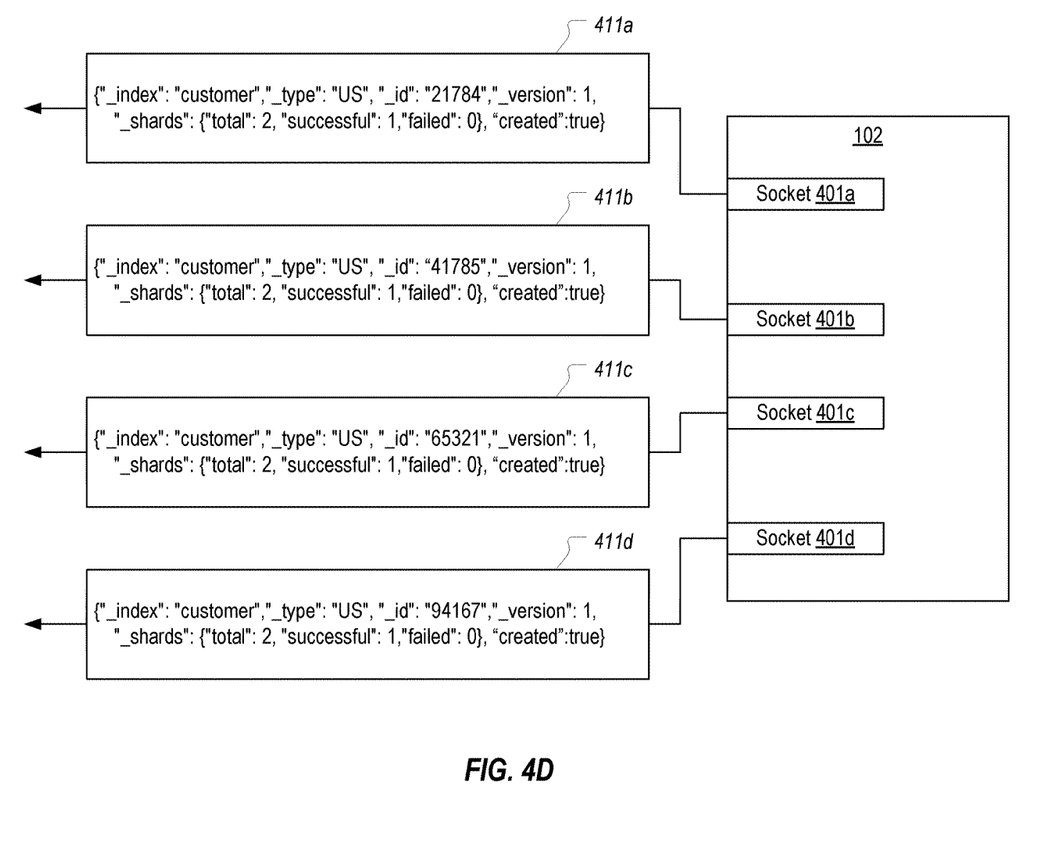

Next, optimizer module 102 can create appropriately configured responses that each includes the corresponding information from bulk response 421. For example, FIG. 4D illustrates that optimizer module 102 has created responses 411*a*-411*d* and sent them over sockets 401*a*-401*d* respectively. In some embodiments, optimizer module 102 may make appropriate changes to the structure of the individual response so that it appears as it would if it had not been part of a bulk request. For example, in bulk request 421, each individual response included "status":201 which is an HTTP status code that indicates that the request has been fulfilled and resulted in a new resource being created. However, each of responses 411*a*-411*d* includes "created":true rather than "status":201 so that responses 411*a*-411*d* are formatted as they would be if server 101 had received and responded to requests 410*a*-410*d* rather than bulk request 420. In other words, optimizer module 102 can format responses 411*a*-411*d* so that the clients that sent request 410*a*-410*d* will not be aware of what optimizer module 102 has done.

Figure 5:
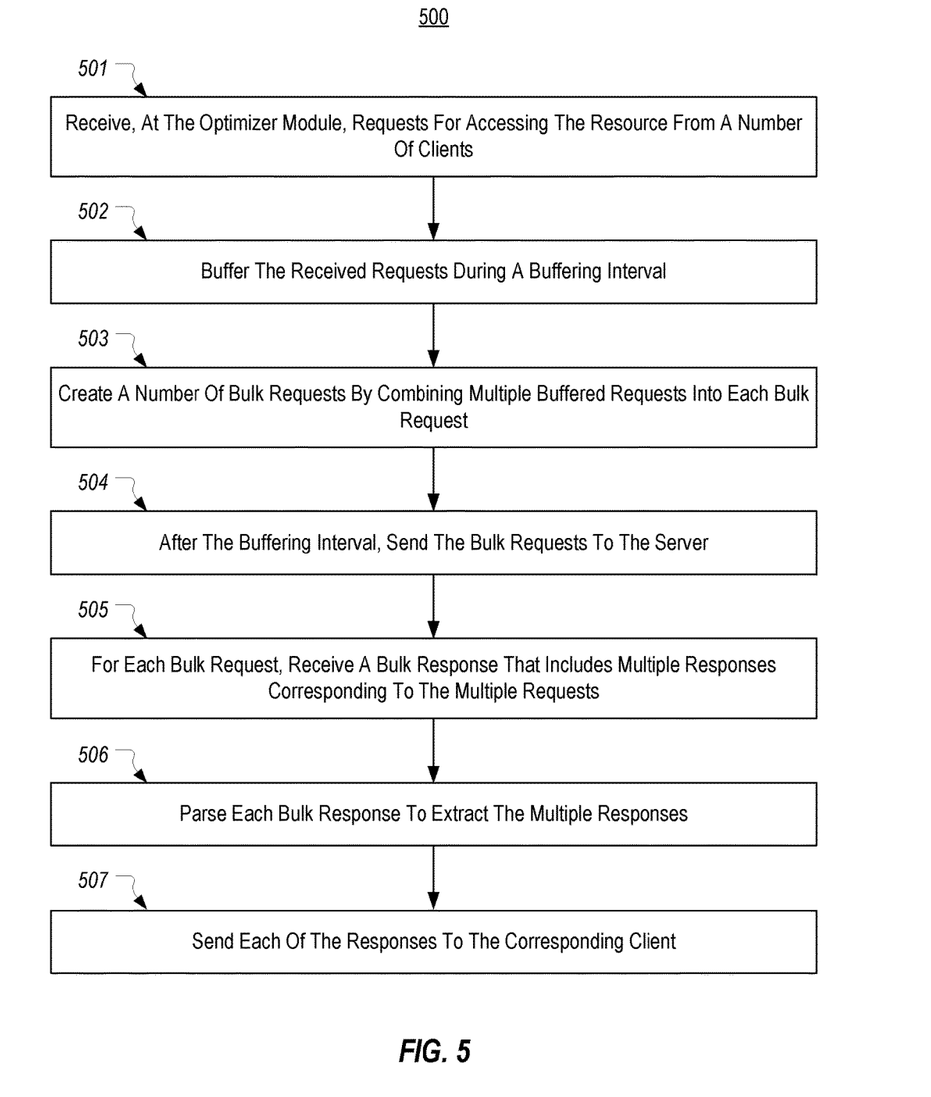
FIG. 5 illustrates a flowchart of an example method for employing an optimizer module to enhance the performance of a server by combining multiple client requests into a bulk request.

FIG. 5 illustrates a flowchart of an example method 500 for optimizing the performance of a server. Method 500 can be implemented by an optimizer module, such as optimizer module 102, that functions as a proxy between a server that provides access to a resource and a number of clients.

Method 500 includes an act 501 of receiving, at the optimizer module, requests for accessing the resource from a number of clients. For example, optimizer module 102 could receive requests 410*a*-410*d* which each request access to database 101*a*.

Method 500 includes an act 502 of buffering the received requests during a buffering interval. For example, optimizer module 102 may store requests 410*a*-410*d*, and possibly many other requests, in buffer 102*b* during a buffering interval defined by timer 102*a*.

Method 500 includes an act 503 of creating a number of bulk requests by combining multiple buffered requests into each bulk request. For example, optimizer module 102 may create bulk request 420 by combining contents of requests 410*a*-410*d*.

Method 500 includes an act 504 of sending the bulk requests to the server after the buffering interval. For example, optimizer module 102 can send bulk request 420, and possibly many other bulk requests, to server 101 after a 100 ms buffering interval or some other buffering interval defined by timer 102*a*.

Method 500 includes an act 505 of, for each bulk request, receiving a bulk response that includes multiple responses corresponding to the multiple requests. For example, optimizer module 102 may receive bulk response 421 that includes the responses to the indexing operations specified in requests 410*a*-410*d* which were combined into bulk request 420.

Method 500 includes an act 506 of parsing each bulk response to extract the multiple responses. For example, optimizer module 102 may extract each individual response from bulk response 421.

Method 500 includes an act 507 of sending each of the responses to the corresponding client. For example, optimizer module 102 may send responses 411*a*-411*d* to the clients that sent requests 410*a*-410*d* respectively where each of responses 411*a*-411*d* includes the corresponding response extracted from bulk response 421.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an optimizer module that functions as a proxy between a server that provides access to a resource and a number of clients, for optimizing the performance of the server, the method comprising:
   receiving, at the optimizer module, requests for accessing the resource from a number of clients;
   buffering the received requests during a buffering interval;
   creating a number of bulk requests by combining multiple buffered requests into each bulk request;
   creating mappings which define where to send responses to the requests combined into each bulk request;

after the buffering interval, sending the bulk requests to the server, each bulk request comprising a single call to a web services application programming interface (API) that specifies each of the multiple requests that have been combined into the bulk request;

for each bulk request, receiving a bulk response that includes multiple responses corresponding to the multiple requests;

parsing each bulk response to extract the multiple responses;

employing the mappings to identify the corresponding client for each of the extracted responses; and sending each of the responses to the corresponding client based on the mappings.

2. The method of claim 1, wherein the buffering interval is a periodic interval.

3. The method of claim 1, wherein the buffering interval is 100 milliseconds.

4. The method of claim 1, wherein the web services API is a representational state transfer (REST) API.

5. The method of claim 1, wherein the mappings identify a socket used by the optimizer module to receive the corresponding request.

6. The method of claim 1, wherein creating a number of bulk requests by combining multiple requests into each bulk request comprises:

selectively combining multiple requests to create bulk requests that are optimized for the server based on one or more of a server specification or monitored performance characteristics of the server.

7. The method of claim 6, wherein the multiple requests are selectively combined to yield an ordering of requests within the bulk request that is optimal for the server.

8. The method of claim 6, wherein the multiple requests are selectively combined to yield a bulk request having an optimal size.

9. The method of claim 6, wherein the multiple requests are selectively combined to yield an optimal number of bulk requests for parallel submission to the server.

10. The method of claim 6, wherein the multiple requests are selectively combined to yield a bulk request having an optimal compression ratio.

11. The method of claim 6, further comprising:

reordering parameters of one or more requests within at least one bulk request to be more optimal for the server.

12. The method of claim 1, wherein the resource is a database and the requests comprise database operations.

13. A system for enabling more clients to concurrently submit hypertext transfer protocol (HTTP) requests to a server, the system comprising:

the server that is configured to provide web services API through which HTTP requests are submitted for accessing a resource; and an optimizer module executing on the server or on another server, the optimizer module being configured to function as a proxy between the server and clients, the optimizer module being configured to:

receive and buffer the clients' HTTP requests during a buffering interval;

generate bulk requests by combining multiple buffered HTTP requests into each bulk request;

create mappings which define where to send responses to the HTTP requests combined into each bulk request;

submit the bulk requests to the server via the web services API such that the server receives and processes the bulk requests rather than the individual HTTP requests sent by the clients;

receive bulk responses to the bulk requests;

parse the bulk responses to extract each individual response;

employing the mappings to identify the corresponding client for each of the individual responses; and for each individual response, send an HTTP response to the corresponding client.

14. The system of claim 13, wherein the optimizer module is further configured to selectively combine multiple buffered HTTP requests into each bulk request to form bulk requests that are optimized for the server based on one or more of a server specification or monitored performance characteristics of the server.

15. One or more computer storage media storing computer executable instructions which when executed by one or more processors implements a method for increasing the performance of a server that provides access to a database via a REST API, the method comprising:

creating, by an optimizer module that functions as a proxy for the server, a buffer for buffering requests for accessing the database;

receiving, by the optimizer module and during a buffering interval, a number of requests;

storing the received requests in the buffer;

after the buffering interval, creating a number of bulk requests by combining multiple buffered requests into each bulk request;

creating mappings which define where to send responses to the requests combined into each bulk request;

sending the number of bulk requests to the server via the REST API, each bulk request comprising a single call to the REST API;

for each bulk request, receiving a bulk response that includes multiple responses corresponding to the multiple requests;

parsing each bulk response to extract the multiple responses;

employing the mappings to identify the corresponding client for each of the extracted responses; and sending each of the responses to the corresponding client based on the mappings.

* * * * *